United States Patent Office 3,751,409
Patented Aug. 7, 1973

3,751,409
METHOD FOR PRODUCING SUGAR ACETALS
Chi-Hang Lee, Spring Valley, N.Y., assignor to General
Foods Corporation, White Plains, N.Y.
No Drawing. Filed June 7, 1971, Ser. No. 150,731
Int. Cl. C07c 47/18
U.S. Cl. 260—210 R     4 Claims

ABSTRACT OF THE DISCLOSURE

Sugar acetals commonly employed as intermediates for the synthesis of other compounds useful in foods and drugs, are prepared by a novel one-step process which reacts sugars containing pyranose and furanose rings with a n,n-dialkoxyalkane in the presence of an acid catalyst. Several new sugar acetals are produced utilizing this process.

BACKGROUND OF THE INVENTION

Field of the invention

This invention relates to the synthesis of sugar derivatives which may be used as intermediates for the synthesis of specific oligosaccharides, glycosides, and other derivatives useful in various foods and drugs; more specifically, the invention relates to improved and simplified processing means adapted to confer specific protecting or blocking groups onto compounds containing pyranose and furanose rings.

Description of the prior art

Sugar cyclic acetals in carbohydrate chemistry are enormously important for a multitude of reasons. One reason is that these acetals are prepared in fairly good yields. Furthermore, the acetal rings formed are stable to a wide variety of reagents, especially under the basic conditions employed for the etherification and esterification of hydroxyl groups. Thereafter, subsequent acid hydrolysis of acetal protecting groups, or hydrogenolysis can be effected under mild conditions.

The cyclic acetals have been of great assistance in the preparation of methylated sugars, deoxy sugars, and amino deoxy sugars, all of which are constituents of many antibiotics such as streptomycin, erythromycin, and neomycin, and also sundry pharmacological agents.

To be sure, all of the investigations in which cyclic acetals have proved invaluable forbid mention herein, but notable examples are to be found in the di- and trisaccharides (also constituents of antibiotics) and sweeteners such as naringin and neohesperidin dihydrochalcones, glycyrrhizin, stevioside, and many others.

Due to the great importance of these cyclic acetals, it is extremely desirable to effect as uncomplicated and efficient a method as practicable to produce these acetals. Nevertheless, the prior art as exemplified in the Journal of Chemical Society 1935, part 2, page 1017, disclose relatively complicated means for preparing a representative cyclic acetal such as methyl 2,3,4,6-diisopropylidene-α-mannopyranoside. (Old nomenclature being methylmannopyranoside 2:3-4:6-Diacetone). In this article, it is evident that α-methylmannopyranoside is first prepared by reacting mannose and methanol. Thereafter the compound is reacted [as in (a) or (b)] to form the acetal.

The disadvantageous aspects inherent in these relatively complicated art known syntheses for producing cyclic acetals are: low yields, lengthy reaction times, and the necessity of employing more and different reactants.

SUMMARY OF THE INVENTION

Applicant has discovered a novel means for synthesizing sugar or cyclic acetals; in particular, the means entail a simple one-step synthesis effected by reacting compounds containing pyranose and furanose rings with a solution of n,n-dialkoxy-alkane in the presence of an acid catalyst. Neither the compound containing the pyranose and/or furanose ring, nor the n,n-dialkoxyalkane are critical; consequently, as long as reactants of these chemical configurations and structure are contacted in the presence of an acid catalyst for a sufficient period, such will suffice. Moreover, variations in the reaction temperatures and acid catalysts will merely influence the reaction time and yields but not the reaction mechanism.

The principal object of the invention is to provide a simple one-step synthesis for producing sugar acetals.

Another object is to reduce the reaction time needed to effect the synthesis of sugar acetals.

A still further object of the invention is to employ fewer and different reactants in the process for synthesizing sugar acetals.

An object further still is to increase the percentage yield of sugar acetals derived from applicant's novel process, and procure novel sugar acetal compounds.

Other objects and advantages of the invention will become apparent in the description and examples hereinafter appearing.

DETAILED DESCRIPTION OF THE INVENTION

The manner for effecting the simple one-step synthesis of sugar acetals essentially entails reacting a solution of a n,n-dialkoxyalkane with compounds containing pyranose and furanose rings, in the presence of an acid catalyst. Preferably the reaction is conducted at ambient temperature using an appropriate ketone such as acetone as the solvent; however, higher temperatures and other solvents may be employed, as these parameters are not critical. The particular n,n-dialkoxyalkane most preferred in the inventive context is 2,2-dimethoxypropane; however, other compounds of the broad class, such as the 2,2-diethoxypropane are also operable. Exemplary, but not restrictive of pyranose and furanose ring compounds contemplated in the invention ambit are rhamnose, mannose, glucuronolactone, galactose, ribose, etc. Representative of, but not limited to the acid catalyst operable in the invention are strong acids such as p-toluenesulfonic acid, sulfuric acid, hydrochloric acid, trifluoroacetic acid and methanesulfonic acid, among others.

The invention will now be described by reference to specific examples:

Example 1

About 16.4 grams of rhamnose (or 18.2 grams of rhamnose hydrate) is stirred for 2 days at ambient temperature in a solution containing 50 milliliters of acetone, 50 milliliters of 2,2-dimethoxypropane and 1 gram of p-toluenesulfonic acid. The mixture is then neutralized with sodium bicarbonate, whereupon a 90% combined yield of α and β methyl rhamnofuranosides in the approximate ratio of 1:1, as their isopropylidene derivatives is produced [compounds may be found in J. Biol. Chem. .106 761 (1934) and 114 9 (1936)]. This yield is in contrast to about 60% when employing prior art techniques.

Example 2

Using mannose in lieu of rhamnose as the starting material, the procedure of Example 1, is followed. A 70% yield of methyl 2,3,4,6-diisopropylidene-α-mannopyranoside is produced [compound may be found in J. Biol. Chem. .1012 (1935)]. In contrast, the Journal of Chemical Society, 1935, part 2, page 1017, disclose in preparation (a) that this compound when produced by the multiple step method at room temperature requires 10 days.

Example 3

Employing glucuronolacetone in lieu of rhamnose as the starting material, the process of Example 1, is followed. A 30% yield of methyl 1,2,3,5-diisopropylidene glucuronate is produced.

Identification of this compound is made by employing conventional mass spectroscopy analytical techniques using a pre-calibrated Consolidated Electrodynamics Corporation 21–110 B mass spectrometer giving the following reading: Mass spectra m/e 273 ($M^+$—$CH_3$), m/e 229, m/e 215, m/e 199.

Example 4

Same as Example 3 except that no acetone is used. Instead the 2,2-dimethoxypropane also functions as a solvent. A 30% yield of methyl 2-(1-methoxyisopropyl)-3,5-isopropylidene methyl α-glucofurano siduronate is produced.

Identification of this compound is made using the instrument of Example 3 to obtain the following reading: Mass spectra m/e 319 ($M^+$—$CH_3$), m/e 245, m/e 201.

Example 5

Same as Example 1, except that galactose was employed in lieu of rhamnose. The reaction produced, in 20–30% yield each, the following compounds:

(a) 1,2,3,4 - di - O-isopropylidene-6-(1-methoxyisopropyl) galactose.
(b) methyl 3,4 - isopropylidene-6-(1-methoxyisopropyl) galactopyranoside.
(c) 1,2,3,4 - di - O-isopropylidene galactose (Compound may be found in J. Biol. Chem. 64 473 (1925)).

Identification of new compounds (a) and (b) are made using the instrument of Example 3 to obtain the following reading:

(a) mass spectra m/e 317 ($M^+$—$CH_3$), m/e 246, m/e 2245, m/e 229, m/e 219.

(b) mass spectra m/e 291 ($M^+$—$CH_3$), m/e 217, m/e 173, m/e 159.

Example 6

Employing ribose in lieu of rhamnose as the starting material, the process of Example 1 is followed. A 40% yield of methyl 2,3-O-isopropylidene-β-ribofuranoside is produced [compound may be found in J. Biol. Chem. 104 299 (1934)].

Although the invention has been described by reference to specific examples, it will be understood that the inventive concept is not limited thereto, and that many sugars containing pyranose and furanose rings may be reacted with dialkoxyalkanes without departing from the spirit and scope of the inventive concept.

What is claimed is:

1. Methyl 1,2,3,5-diisopropylidene glucuronate.
2. Methyl 2-(1-methoxyisopropyl)-3,5 - isopropylidene methyl α-glucofuranosiduronate.
3. 1,2,3,4-di - O - isopropylidene - 6 - (1 - methoxyisopropyl) galactose.
4. Methyl 3,4-isopropylidene-6-(1 - methoxyisopropyl) galactose.

References Cited

UNITED STATES PATENTS 3,451,993  6/1969  Goshima et al. _____ 260—210 R

OTHER REFERENCES

Hampton: "Jour. Amer. Chem. Soc.," vol. 83, 1961, pp. 3640–3643.

LEWIS GOTTS, Primary Examiner

J. R. BROWN, Assistant Examiner

U.S. Cl. X.R.

99—141 R; 260—999

UNITED STATES PATENT OFFICE
CERTIFICATE OF CORRECTION

Patent No. 3,751,409　　　　Dated　August 7, 1973

Inventor(s)　Chi-Hang Lee

It is certified that error appears in the above-identified patent and that said Letters Patent are hereby corrected as shown below:

In Column 3, Line 32, after "Chem." change "64 473" to --64 473--.

In Column 3, Line 37, change "2245," to --245--.

In Column 4, Line 23, change "galactose." to --galactopyranoside.--

Signed and sealed this 23rd day of April 1974.

(SEAL)
Attest:

EDWARD M.FLETCHER,JR.
Attesting Officer

C. MARSHALL DANN
Commissioner of Patents